United States Patent
Nik-Zainal et al.

(10) Patent No.: US 12,537,074 B2
(45) Date of Patent: *Jan. 27, 2026

(54) METHOD OF CHARACTERISING A DNA SAMPLE

(71) Applicant: Genome Research Limited, Hinxton (GB)

(72) Inventors: Serena Nik-Zainal, Hinxton (GB); Helen Davies, Hinxton (GB); Dominik Glodzik, Hinxton (GB); Sandro Morganella, Hinxton (GB)

(73) Assignee: Genome Research Limited, Cambridge (GB)

( * ) Notice: Subject to any disclaimer, the term of this patent is extended or adjusted under 35 U.S.C. 154(b) by 1129 days.

This patent is subject to a terminal disclaimer.

(21) Appl. No.: 16/096,723

(22) PCT Filed: Apr. 28, 2017

(86) PCT No.: PCT/EP2017/060294
§ 371 (c)(1),
(2) Date: Oct. 26, 2018

(87) PCT Pub. No.: WO2017/191074
PCT Pub. Date: Nov. 9, 2017

(65) Prior Publication Data
US 2019/0139625 A1    May 9, 2019

(30) Foreign Application Priority Data

May 1, 2016  (GB) ..................................... 1607630
Mar. 10, 2017  (GB) ..................................... 1703903

(51) Int. Cl.
*G16B 20/10* (2019.01)
*C12Q 1/6886* (2018.01)
*G16B 5/00* (2019.01)
*G16B 10/00* (2019.01)
*G16B 20/00* (2019.01)
*G16B 25/10* (2019.01)
*G16B 30/00* (2019.01)
*G16B 50/00* (2019.01)

(52) U.S. Cl.
CPC .......... *G16B 20/10* (2019.02); *C12Q 1/6886* (2013.01); *G16B 5/00* (2019.02); *G16B 10/00* (2019.02); *G16B 20/00* (2019.02); *G16B 25/10* (2019.02); *G16B 30/00* (2019.02); *G16B 50/00* (2019.02); *C12Q 2537/165* (2013.01); *C12Q 2600/106* (2013.01); *C12Q 2600/156* (2013.01)

(58) Field of Classification Search
CPC .............. G16B 25/10; C12Q 2537/165
See application file for complete search history.

(56) References Cited

U.S. PATENT DOCUMENTS

| 7,097,977 | B1 | 8/2006 | Takeda et al. |
|---|---|---|---|
| 2005/0249822 | A1 | 11/2005 | Pilkiewicz et al. |
| 2012/0035244 | A1 | 2/2012 | Chinnaiyan et al. |
| 2013/0281312 | A1 | 10/2013 | Richardson et al. |
| 2014/0031260 | A1 | 1/2014 | O'Donnell et al. |
| 2014/0278135 | A1 | 9/2014 | Pruss et al. |
| 2014/0363521 | A1* | 12/2014 | Abkevich ............... A61P 43/00 702/19 |
| 2014/0364434 | A1 | 12/2014 | Daeman et al. |
| 2015/0142465 | A1 | 5/2015 | Vaske et al. |
| 2016/0152985 | A1 | 6/2016 | D'Andrea et al. |
| 2019/0115105 | A1 | 4/2019 | Liu et al. |
| 2019/0119759 | A1 | 4/2019 | Nik-Zainal et al. |
| 2019/0130997 | A1 | 5/2019 | Nik-Zainal et al. |
| 2020/0126635 | A1 | 4/2020 | Nik-Zainal et al. |

FOREIGN PATENT DOCUMENTS

| CA | 2958801 A1 | 2/2016 |
|---|---|---|
| CN | 1976711 A | 6/2007 |
| CN | 101490553 A | 7/2009 |

(Continued)

OTHER PUBLICATIONS

Marquard, A.M., Eklund, A.C., Joshi, T., Krzystanek, M., Favero, F., Wang, Z.C., Richardson, A.L., Silver, D.P., Szallasi, Z. and Birkbak, N.J. Pan-cancer analysis of genomic scar signatures associated with homologous recombination deficiency suggests novel indications for existing cancer drugs. (Year: 2015).*

Ayers, K.L. and Cordell, H.J.,SNP selection in genome-wide and candidate gene studies via penalized logistic regression. Genetic Epidemiology, 34(8), pp. 879-891. (Year: 2010).*

(Continued)

*Primary Examiner* — Olivia M. Wise
*Assistant Examiner* — Janna Nicole Schultzhaus
(74) *Attorney, Agent, or Firm* — Wolf, Greenfield & Sacks, P.C.

(57) ABSTRACT

The invention provides a method of characterising a DNA sample obtained from a tumour, the method including the steps of: determining the presence or absence of a plurality of base substitution signatures, rearrangement signatures and indel signatures in the sample and copy number profiles for the sample; generating, from the presence or absence of said plurality of base substitution signatures, rearrangement signatures and indel signatures and the copy number profile for the sample, a probabilistic score; and based on said probabilistic score, identifying whether said sample has a high or low likelihood of being homologous recombination (HR)-deficient. Identification of a tumour as HR-deficient may be used to inform treatment choices, for example treatment with a PARP inhibitor or platinum therapy or an anthracycline.

13 Claims, 2 Drawing Sheets

(56) References Cited

FOREIGN PATENT DOCUMENTS

| | | |
|---|---|---|
| EP | 3452938 A1 | 3/2019 |
| JP | 2010-506939 A | 3/2010 |
| JP | 2013-537045 A | 9/2013 |
| JP | 2014-532859 A | 12/2014 |
| JP | 2015/506678 A | 3/2015 |
| WO | 2002/006481 A1 | 1/2002 |
| WO | 2008/016374 A2 | 2/2008 |
| WO | 2009064738 A2 | 5/2009 |
| WO | WO-2013/096843 A1 | 6/2013 |
| WO | 2013130347 A1 | 9/2013 |
| WO | WO-2013/182645 A1 | 12/2013 |
| WO | WO-2013/190441 A2 | 12/2013 |
| WO | WO-2015/086473 A1 | 6/2015 |
| WO | WO-2017/191068 A1 | 11/2017 |
| WO | WO-2017/191073 A1 | 11/2017 |
| WO | WO-2017/191074 A1 | 11/2017 |
| WO | WO-2017/191076 A1 | 11/2017 |

OTHER PUBLICATIONS

Alexandrov, L. B., Nik-Zainal, S., Wedge, D.C., Aparicio, S.A., Behjati, S., Biankin, A.V., Bignell, G.R., Bolli, N., Borg, A., Børresen-Dale, A.L. and Boyault, S. Signatures of mutational processes in human cancer. Nature, 500(7463), pp. 415-421. Supplementary Information, p. 1-108. (Year: 2013).*

Volleberg et al., "Genomic instability in breast and ovarian cancers: translation into clinical predictive biomarkers," Cell Mol Life Sci. 69(2):223-45 (2012).

Combined Search and Examination Report Under Sections 17 and 18(3) for British Application No. 1706944.4, dated Feb. 8, 2018 (8 pages).

Office Action for Japanese Patent Application No. 2018-557362, dated Aug. 3, 2021.

Abkevich et al., "Patterns of genomic loss of heterozygosity predict homologous recombination repair defects in epithelial ovarian cancer," Br J Cancer. 107(10):1776-1782 (2012).

Abkevich et al., "Supplementary Material for: Patterns of Genomic Loss of Heterozygosity Predict Homologous Recombination Repair Defects in Epithelial Ovarian Cancer," Br J Cancer. (2012) (20 pages).

Alexandrov et al., "A mutational signature in gastric cancer suggests therapeutic strategies," Nat Commun. 6:8683 (2015) (7 pages).

Alexandrov et al., "Clock-like mutational processes in human somatic cells," Nat Genet. 47(12):1402-1407, doi: 10.1038/ng.3441 (2015) (9 pages).

Alexandrov et al., "Deciphering Signatures of Mutational Processes Operative in Human Cancer," Cell Rep. 3(1):246-59 (2013).

Alexandrov, Ludmil B., Thesis: "Signatures of Mutational Processes in Human Cancer," Doctor of Philosophy, Darwin College, University of Cambridge, 2014 (247 pages).

Chan et al., "Clusters of Multiple Mutations: Incidence and Molecular Mechanisms," available in PMC Jan. 12, 2016, published in final edited form as: Annu Rev Genet. 49:243-67 (2015) (32 pages).

International Preliminary Report on Patentability for International Application No. PCT/EP2017/060279, issued Nov. 6, 2018 (7 pages).

International Preliminary Report on Patentability for International Application No. PCT/EP2017/060289, issued Nov. 6, 2018 (9 pages).

International Preliminary Report on Patentability for International Application No. PCT/EP2017/060294, issued Nov. 6, 2018 (10 pages).

International Preliminary Report on Patentability for International Application No. PCT/EP2017/060298, issued Nov. 6, 2018 (8 pages).

International Search Report and Written Opinion for International Application No. PCT/EP2017/060279, mailed Aug. 31, 2017 (10 pages).

International Search Report and Written Opinion for International Application No. PCT/EP2017/060289, mailed Jul. 17, 2017 (12 pages).

International Search Report and Written Opinion for International Application No. PCT/EP2017/060294, mailed Jul. 31, 2017 (15 pages).

International Search Report and Written Opinion for International Application No. PCT/EP2017/060298, mailed Aug. 2, 2017 (12 pages).

Malhotra et al., "Breakpoint profiling of 64 cancer genomes reveals numerous complex rearrangements spawned by homology-independent mechanisms," Genome Research. 23(5): 762-776 (2013) (17 Pages).

Menghi et al., "The tandem duplicator phenotype as a distinct genomic configuration in cancer," Proc Natl Acad Sci USA. 113(17):E2373-E2382 (2016).

Nik-Zainal et al., "Landscape of somatic mutations in 560 breast cancer whole genome sequences," available in PMC Nov. 2, 2016, published in final edited form as: Nature. 534(7605):47-54 (2016) (40 pages).

Nik-Zainal, Serena, Thesis: "Exploring mutational signatures in twenty-one breast cancers," Doctor of Philosophy, University of Cambridge, 2012 (235 pages).

Pleasance et al., "A small-cell lung cancer genome with complex signatures of tobacco exposure," Nature. 463(7278): 184-190 (2009) (9 Pages).

Schulze et al., "Exome sequencing of hepatocellular carcinomas identifies new mutational signatures and potential therapeutic targets," available in PMC Nov. 1, 2015, published in final edited form as: Nature Genet. 47(5):505-11 (2015) (22 pages).

Nik-Zainal et al., "Mutational processes molding the genomes of 21 breast cancers," Cell. 149(5):979-93 (2012).

Notice of Reasons for Rejection and English Translation for Japanese Patent Application No. 2019-508296, mailed Apr. 13, 2021 (5 pages).

Marquard, Andrea et al., "Pan-cancer analysis of genomic scar signatures associated with homologous recombination deficiency suggests novel indications for existing cancer drugs," Biomarker Research, Mar. 1, 2015.

Ayers, Kristin L. et al., "SNP Selection in Genome-Wide and Candidate Gene Studies via Penalized Logistic Regression," Generic Epidemiology, vol. 34, pp. 879-891, Nov. 18, 2010.

Piraino S.W. et al., "Beyond the exome: the role of non-coding somatic mutations in cancer," Annals of Oncology, vol. 27, pp. 240-248, Nov. 23, 2015.

Polak, Paz et al, "A mutational signature reveals alterations underlying deficient homologous recombination repair in breast cancer," Nat Genet, vol. 49(10), pp. 1476-1486, Oct. 2017.

Lolascon, A. et al, "Frequent clonal loss of heterozygosity (OLH) in the chromosomal region 1p32 occurs in childhood T cell acute lymphoblastic leukemia (R-ALL) carrying rearrangements of the TAL1 gene," Leukemia 1997, vol. 11(3), pp. 359-363, Mar. 1997.

Alexandrov, Ludmil, "Deciphering signatures of mutational processes from mutational catalogues of cancer genomes," PhD. Thesis 2014, Chap 2.

Office Action dated Sep. 28, 2022 in U.S. Appl. No. 16/096,723.

Office Action dated Nov. 14, 2022 in Chinese Application 201780027322.7.

Office Action dated Dec. 7, 2022 in U.S. Appl. No. 16/096,731.

Office Action dated Nov. 30, 2022 in Chinese Application 201780027314.2.

Office Action dated Mar. 11, 2022 in European Application 17720779.2.

Office Action dated Apr. 5, 2022 in European Application 17721610.8.

Office Action dated Feb. 18, 2022 in European Application 17720140.7.

Office Action dated Jul. 5, 2022 In Japanese Application 2018-557362.

Abecasis GR et al., "An integrated map of genetic variation from 1,092 human genomes," Nature, Nov. 1, 2012, vol. 491, pp. 56-65.

(56) References Cited

OTHER PUBLICATIONS

Banerji, Shantanu et al., "Sequence analysis of mutations and translocations across breast cancer subtypes," Nature, vol. 486, Jun. 21, 2012, pp. 405-409.

Bao, Riyue et al., "Review of Current Methods, Applications, and Data Management for the Bioinformatics Analysis of Whole Exome Sequencing," Cancer InformaticICs, Sep. 21, 2014, Supplemental 2, pp. 67-82.

Bergamaschi, A. et al., "Extracellular matrix signature identifies breast cancer subgroups with different clinical outcome," Journal of Pathology, Sep. 2008, vol. 214, Issue 3, pp. 357-367.

Birkbak, Nicolai et al., "Telomeric Allelic Imbalance Indicates Defective DNA Repair and Sensitivity to DNA-Damaging Agents," Cancer Discovery, Mar. 22, 2012, vol. 2, Issue 4, pp. 366-375.

Office Action issued Aug. 12, 2022 in Chinese Application 201780027340.5.

Ching, Ho Ching et al., "Integrated analysis of copy No. and loss of heterozygosity in primary breast carcinomas using high-density SNP array," Jan. 21, 2011, International Journal of Oncology, vol. 28, pp. 621-633.

Chopra, Neha et al., "Homologous recombination DNA repair deficiency and PARP inhibition activity in primary triple negative breast cancer," May 29, 2020, Nature Communications, vol. 11.

Curtis, Christina et al., "The genomic and transcriptomic architecture of 2,000 breast tumours reveals novel subgroups," Nature, vol. 486, Dec. 21, 2012, pp. 346-352.

Davies, Helen et al., "HRDetect is a predictor of BRCA1 and BRCA2 deficiency based on mutational-signatures," Nature Medicine, vol. 23, Issue No. 4, Mar. 2, 2018, pp. 517-525.

Degasperi, Andrea et al., "A practical framework and online tool for mutational signature analyses show inter- tissue variation and driver dependencies," Nature Journal, vol. 1, Issue 2, Feb. 28, 2020, pp. 249-263.

Ellis, Matthew et al., "hole-genome analysis informs breast cancer response to aromatase inhibition," Jun. 21, 2012, vol. 486.

Fang, Min et al., "Genomic Differences Between Estrogen Receptor (ER)-Positive and ER-Negative Human Breast Carcinoma Identified by Single Nucleotide Polymorphism Array Comparative Genome Hybridization Analysis," Cancer, May 15, 2011, vol. 117, Issue No. 10, pp. 2024-2034.

Fischer, Andrej et al., "EMu: probabilistic inference of mutational processes and their localization in the cancer genome," Genome Biology, Apr. 2013, vol. 14, Issue No. 4.

Fu, Wenqing et al., "Analysis of 6,515 exomes reveals a recent origin of most human protein-coding variants," Nature, Jan. 10, 2013, vol. 493, pp. 216-220.

Garassino, Marina et al., "ESMO Patients Guide Series," 2014, pp. 1-46.

Helleday, Thomas et al., "Mechanisms underlying mutational signatures in human cancers," Nature Reviews Genetics, vol. 15, Sep. 2014.

Hicks, James et al., "Novel patterns of genome rearrangement and their association with survival in breast cancer," Cold Spring Harbor Laboratory Press, Aug. 17, 2023.

Nik-Zainal, Serena et al., "The Life History of 21 Breast Cancers," Elsevier Inc., May 25, 2012, pp. 994-1007.

Pleasance, Erin D. et al., "A comprehensive catalogue of somatic mutations from a human cancer genome," Nature Journal, vol. 463, Dec. 16, 2009, pp. 191-196.

Popova, Tatiana et al., "Ploidy and Large-Scale Genomic Instability Consistently Identify Basal-like Breast Carcinomas with BRCA1/2 Inactivation," Cancer Research, vol. 72, Issue 21, Nov. 1, 2012.

Shah, Sohrab et al., "The clonal and mutational evolution spectrum of primary triple negative breast cancers," Nature, vol. 486, Dec. 16, 2013.

Sherry, S.T. et al., "dbSNP: the NCBI database of genetic variation," Nucleic Acids Research, vol. 29, No. 1, Oct. 4, 2000, pp. 308-311.

Stratton, Michael R. et al, "The cancer genome," Nature, vol. 458, Apr. 9, 2009.

Stratton, Michael R., "Exploring the Genomes of Cancer Cells: Progress and Promise," Science, vol. 331, Mar. 25, 2011.

Telli, Melinda et al., "Homologous Recombination Deficiency (HRD) Score Predicts Response to Platinum-Containing Neoadjuvant Chemotherapy in Patients with Triple-Negative Breast Cancers," Clin Cancer Res., Aug. 1, 2016, vol. 22, Issue No. 15, pp. 3764-3773.

Timms, Kirsten M. et al., "Association of BRCA1/2defects with genomic scores predictive of DNA damage repair deficiency among breast cancer subtypes," Breast Cancer Research, vol. 16, Dec. 5, 2014.

Ford, D. et al., "Genetic heterogeneity and penetrance analysis of the BRCA1 and BRCA2 genes in breast cancer families," The Breast Cancer Linkage Consortium. American journal of human genetics, vol. 62, Issue 3, pp. 676-689 Mar. 1998.

Risch H. A. et al. "Prevalence and penetrance of germline BRCA1 and BRCA2 mutations in a population series of 649 women with ovarian cancer," American journal of human genetics, vol. 68, pp. 700-710.

Greer J. B. et al. "Role of BRCA1 and BRCA2 mutations in pancreatic cancer," Gut, vol. 56, Issue 5, pp. 601-605, May 2007.

Alexandrov, L. B. et al, "Signatures of mutational processes in human cancer," Nature, vol. 500, pp. 415-421, Aug. 14, 2013.

Waddell, N. et al., "Whole genomes redefine the mutational landscape of pancreatic cancer," Nature, vol. 518, pp. 495-501, Feb. 25, 2015.

Jackson, S. P., "Sensing and repairing DNA double-strand breaks," Carcinogenesis, vol. 23, pp. 687-696 (2002).

King, Mary-Claire et al., "Breast and ovarian cancer risks due to inherited mutations in BRCA1 and BRCA2," Science, vol. 302, Issue 5645, pp. 643-646, Oct. 24, 2003.

Merajver, S. D. et al., "Somatic mutations in the BRCA1 gene in sporadic ovarian tumours," Nature genetics, vol. 9, pp. 439-443, Apr. 1, 1995.

Miki Y., et al., "Y. Mutation analysis in the BRCA2 gene in primary breast cancers," Nature genetics, vol. 13, pp. 245-247, Jun. 1, 1996.

Office Action mailed Sep. 26, 2023 in Japanese Application 2019-508296.

Uemura,, Masako et al., "The present and future of platinum cancer drugs," Biomedical Research on Trace Elements, vol. 26, No. 4, pp. 157-165, 2015.

Office Action mailed Feb. 27, 2024 in Japanese Application 2022-175913.

Summons to Attend Oral Proceeding Pursuant to Rule 115(1) EPC issued Nov. 7, 2024 in EP Application 17721610.8.

Watkins, Johnathan A. et al., "Genomic scars as biomarkers of homologous recombination deficiency and drug response in breast and ovarian cancers," Breast Cancer Research, vol. 16, Art. 211, Jun. 3, 2014.

Abkevich, V. et al., "Patterns of genomic loss of heterozygosity predict homologous recombination repair defects in epithelial ovarian cancer," British journal of cancer, vol. 107, pp. 1776-1782, Jun. 27, 2012.

Alexandrov, Ludmil B. et al., "A mutational signature in gastric cancer suggests therapeutic strategies," Nature Communications, Aug. 6, 2015, p. 1-7.

Raine, K. M. et al., "cgpPindel: Identifying somatically acquired insertion and deletion events from paired end sequencing," Curr. Protoc. Bioinform. 52:15.7.1-15.7.12. doi: 10.1002/0471250953. bi1507s52, Dec. 2015.

Ye, Kai et al., "Pindel: a pattern growth approach to detect break points of large deletions and medium sized insertions from paired-end short reads," Bioinformatics, vol. 25, No. 21, Jun. 21, 2009, pp. 2865-2871.

Yates, Lucy R. et al., "Subclonal diversification of primary breast cancer revealed by multiregion sequencing," Nature Medicine, vol. 21, pp. 751-759, 2015.

Rodriguez, A. A., et al., "DNA repair signature is associated with anthracycline response in triple negative breast cancer patients," Breast Cancer Res Treat , vol. 123, pp. 189-196, Jun. 26, 2010.

(56) References Cited

OTHER PUBLICATIONS

Chappuis, P. O., et al., "A significant response to neoadjuvant chemotherapy in BRCA1/2 related breast cancer," J Med Genet, vol. 39, pp. 608-610, 2002.

\* cited by examiner

FIG. 1

| Patient | PD9768 | PD9769 | PD9770 | PD9771 | PD9777 | PD9772 | PD9774 | PD9775 | PD9776 |
|---|---|---|---|---|---|---|---|---|---|
| Treatment Response | RD | RD | RD | RD | RD | CR | CR | CR | CR |
| BRCA1/BRCA2 status | | | | | | | BRCA1 | | BRCA1 |
| Pre-treatment Biopsy 1 | PD9768c | PD9769c | PD9770c | PD9771c | PD9777c | PD9772a2 | PD9774c | PD9775c | PD9776c |
| Probabilistic Score | 0.02 | 0.22 | 0.01 | 0.00 | 0.55 | 1.00 | 1.00 | 1.00 | 1.00 |
| Pre-treatment Biopsy 2 | | | PD9770d | PD9771a | PD9777a | | | PD9775a | PD9776a |
| Probabilistic Score | | | 0.14 | 0.01 | 0.03 | | | 1.00 | 1.00 |
| Post-treatment specimen from surgical block | | PD9769a | PD9770a | PD9771d | PD9777d | | | | |
| Probabilistic Score | | 0.16 | 0.39 | 0.03 | 0.07 | | | | |

FIG. 2

METHOD OF CHARACTERISING A DNA SAMPLE

RELATED APPLICATIONS

This Application is a national stage filing under 35 U.S.C. § 371 of International Patent Application Serial No. PCT/EP2017/060294, filed Apr. 28, 2017, entitled "METHOD OF CHARACTERISING A DNA SAMPLE," which claims the benefit of British application number 1703903.3, filed Mar. 10, 2017, entitled "METHOD OF CHARACTERISING A DNA SAMPLE," and British application number 1607630.9, filed May 1, 2016, entitled "METHOD OF CHARACTERISING A DNA SAMPLE." The entire contents of these applications are incorporated herein by reference in their entirety.

FIELD OF INVENTION

The present invention relates to a method of characterising a DNA sample. It is particularly, but not exclusively, concerned with a method for characterising the properties of cancer based on a DNA sample from a tumour.

BACKGROUND TO THE INVENTION

Somatic mutations are present in all cells of the human body and occur throughout life. They are the consequence of multiple mutational processes, including the intrinsic slight infidelity of the DNA replication machinery, exogenous or endogenous mutagen exposures, enzymatic modification of DNA and defective DNA repair. Different mutational processes generate unique combinations of mutation types, termed "Mutational Signatures".

Whole genome sequencing (WGS) permits the exploration of all classes of somatic mutation in human cancer genomes, including base substitutions, insertions/deletions (indels), rearrangements/structural variation (SV), and copy number aberrations (CNA). To date, approximately 2,500 whole cancer genomes of multiple tumour types have been reported worldwide.

These enormous datasets provide extraordinary power for aggregated analyses and efforts are underway to meticulously explore these data in order to further our understanding of basic cancer biology (International Cancer Genome Consortium Pan-Cancer Analysis Working Group (dcc.icg-c.org/pcawg). Already, cancer WGS studies have revealed the enormous diversity of mutations that exist between patients (inter-tumour heterogeneity) as well as within individual cancers (intra-tumour heterogeneity). Indeed, the overarching message is that cancer is extremely complex. No two cancers are alike. Thus, the vast amounts of WGS data can seem daunting and simply too complicated to be clinically meaningful.

Recently, 560 WGS breast cancers were reported; the largest collection of WGS cancers of a single cancer type to date. Critical biological insights were extracted from the totality of data, specifically, putative causal mutations that confer selective advantage ("driver" mutations) and passenger mutation patterns which report biological phenomena that have gone awry through cancer development ("mutation signatures"). The products of this WGS breast cancer dataset included 1,628 putative driver mutations in 93 genes, twelve base substitution signatures, two indel signatures, six rearrangement signatures and copy number profiles.

Driver and mutation signature information extracted from aggregated datasets can, however, be distilled for individual patients to generate personalised genomic profiles. Interestingly, although no two patients share the same set of somatic mutations, holistic consideration of integrated genomic profiles can be informative and have clinical potential.

One base substitution signature (Signature 3) was previously shown to distinguish BRCA1/2 null from sporadic breast cancers in a small cohort of breast cancers. Subsequently, Signature 3 was found to be present in breast, pancreatic and ovarian cancer. BRCA1/2 are involved in homologous recombination (HR) double strand break repair and inactivation of these genes may be achieved through germline and/or somatic mutations or promoter hypermethylation of BRCA1.

Germline inactivating mutations in BRCA1 and/or BRCA2 cause an increased risk of early-onset breast [1, 2], ovarian [2, 3], and pancreatic cancer [4], while somatic mutations in these two genes and BRCA1 promoter hypermethylation have also been implicated in development of these cancer types [5, 6]. BRCA1 and BRCA2 are involved in error-free homology-directed double strand break repair [7]. Cancers with defects in BRCA1 and BRCA2 consequently show large numbers of rearrangements and indels due to error-prone repair by non-homologous end joining mechanisms, which assume responsibility for double strand break repair [8, 9].

While defective double strand break repair increases the mutational burden of a cell, thus increasing the chances of acquiring somatic mutations that lead to neoplastic transformation, it also renders a cell more susceptible to cell cycle arrest and subsequent apoptosis when it is exposed to agents such as platinum based antineoplastic drugs [10, 11]. This susceptibility has been successfully leveraged for the development of targeted and less toxic therapeutic strategies for treatment of breast, ovarian, and pancreatic cancers harbouring BRCA1 and/or BRCA2 mutations, notably Poly (ADP-ribose) polymerase (PARP) inhibitors [10, 11]. These treatments cause a multitude of DNA double strand breaks that force neoplastic cells with defective BRCA1 and BRCA2 function into apoptosis since they lack the ability to effectively repair double strand breaks. In contrast, normal cells remain mostly unaffected since their repair machinery is not compromised.

Accordingly, identification of whether a cancer is BRCA1/2 deficient or proficient may be of considerable assistance in the planning of treatment. A method of classifying DNA samples, such as samples from a tumour, would therefore provide for considerable benefit in diagnosis of possible cancer types in that tumour or may allow selection of patients for particular types of therapy.

STATEMENTS OF INVENTION

An exemplary embodiment of the present invention provides a method of characterising a DNA sample obtained from a tumour, the method including the steps of: determining the presence or absence of a plurality of: base substitution signatures, rearrangement signatures and insertion/deletion (indel) signatures in the sample and copy number profiles for the sample; generating, from the presence or absence of said plurality of base substitution signatures, rearrangement signatures and indel signatures in the sample and the copy number profiles for the sample, a probabilistic score; and based on said probabilistic score, identifying whether said sample has a high or low likelihood of being homologous recombination (HR)-deficient.

A further exemplary embodiment of the present invention provides computer program product containing non-transitory memory storing a computer program which, when run on a computer, performs the steps of: determining the presence or absence of a plurality of: base substitution signatures, rearrangement signatures and indel signatures in a DNA sample obtained from a tumour and determining the copy number profiles for the sample; generating, from the presence or absence of a plurality of base substitution signatures, rearrangement signatures and indel signatures in the sample and the copy number profiles for the sample, a probabilistic score; and based on said probabilistic score, identifying whether said sample has a high or low likelihood of being homologous recombination (HR)-deficient.

A further exemplary embodiment of the present invention provides a computer having a processor, wherein the processor is configured to: determine the presence or absence of a plurality of base substitution signatures, rearrangement signatures and indel signatures in a DNA sample obtained from a tumour and determining the copy number profiles for the sample; generate, from the presence or absence of a plurality of base substitution signatures, rearrangement signatures and indel signatures in the sample and the copy number profiles for the sample, a probabilistic score; and based on said probabilistic score, identify whether said sample has a high or low likelihood of being homologous recombination (HR)-deficient.

DETAILED DESCRIPTION

A first aspect of the present invention provides a method of characterising a DNA sample from a tumour, the method including the steps of: determining the presence or absence of a plurality of base substitution signatures, rearrangement signatures and one or more indel signatures in the sample and copy number profiles for the sample; generating, from the presence or absence of said plurality of base substitution signatures, rearrangement signatures and indel signatures in the sample and the copy number profile for the sample, a probabilistic score; and based on said probabilistic score, identifying whether said sample has a high or low likelihood of being homologous recombination (HR)-deficient.

A second aspect of the present invention provides a method of characterising a DNA sample from a tumour, the method including the steps of:

performing two or more of the following steps:
   a) determining the presence or absence of at least one base substitution signature in the sample
   b) determining the presence or absence of at least one rearrangement signature in the sample
   c) determining the presence or absence of at least one indel signature in the sample; and
   d) determining a copy number profile for the sample;
generating, from the above determinations, a probabilistic score; and based on said probabilistic score, identifying whether said sample has a high or low likelihood of being homologous recombination (HR)-deficient.

Preferably three or more and more preferably all four of the determining steps of this aspect are performed. The probabilistic score and the weighting of the determinations in generating that probabilistic score may vary depending on the which determining steps are performed and/or depending on the number of determining steps performed and/or the number of signatures or profiles used in each determining step.

Optional and preferred features will now be set out which can be applied to any and all of the aspects described above in any combination.

Where base substitution signatures are considered, preferably the base substitution signatures include either base substitution signature 3 or base substitution signature 8 or both.

Where rearrangement signatures are considered, preferably the plurality of rearrangement signatures include either rearrangement signature 5 or rearrangement signature 3 or both.

Where indel signatures are considered, preferably the plurality of indel signatures include microhomology-mediated indels.

Preferably the copy number profiles, if considered, include the HRD copy number-based index.

In particular embodiments of the present invention, the plurality of base substitution signatures, the plurality of rearrangement signatures and the plurality of indel signatures consist of base substitution signature 3, base substitution signature 8, rearrangement signature 5 and rearrangement signature 3 and microhomology-mediated indels. Following an extensive study of WGS from breast cancers, these five factors, together with the copy number profile, have been found to have the greatest influence on whether a tumour is HR-deficient or not.

Preferably in such embodiments, the probabilistic score is a weighted score which gives weight to the factors in the following precedence (greatest first): microhomology-mediated indels, base substitution signature 3, rearrangement signature 5, the HRD copy number-based index, rearrangement signature 3 and base substitution signature 8. The study of WGS from breast cancers found that the above order was indicative of the importance of these six factors.

The method may further include the step of cataloguing the somatic mutations in said sample to produce a mutational catalogue for that sample, wherein the presence or absence of said base substitution signatures, rearrangement signatures and/or indel signatures, as required, is derived from said mutational catalogue.

When such a catalogue has been obtained, the method may further include the step of determining the number of mutations in the mutational catalogue which are attributable to each of the base substitution signatures, rearrangement signatures and/or indel signatures, as required, which are determined to be present.

Generating the probabilistic score may include the sub steps of: log-transforming the number of mutations attributed to each of the signatures; normalising the log-transformed number of mutations for each signature and the copy number profile; and weighting each of said normalised values by a predetermined weighting factor which represents the likelihood of the signature or profile associated with that value causing the tumour to be HR deficient.

By log-transforming the number of mutations and normalising all of the features, an accurate balance between the influence of the various factors can be obtained.

In one particular embodiment, the probabilistic score is generated as $$P(C_i = BRCA) = \frac{1}{1 + e^{-(\beta_0 + x_i^T \beta)}}$$

where $C_i$ is the variable encoding the status of $i^{th}$ sample
$\beta_0$ is the intercept weight
$x_i^T$ is the vector encoding features of $i^{th}$ sample; and
$\beta$ is the vector of weights.

For embodiments wherein the features consist of the six features set out above, the vector of weights $\beta$ may be as set out below in Table 1, or within a variation of ±10%, preferably ±5% of these weights:

TABLE 1

| Feature | weight β |
|---|---|
| Proportion of indels with micro-homology | 2.129 |
| Number of base substitutions of signature 3 | 1.239 |
| Number of rearrangement signature 5 rearrangements | 0.978 |
| HRD index | 0.613 |
| Number of rearrangement signature 3 rearrangements | 0.588 |
| Number of base substitutions of signature 8 | 0.444 |

For other embodiments wherein the features consist of the six features set out above, the vector of weights $\beta$ may be as set out below in Table 2, or within a variation of ±10%, preferably ±5% of these weights:

TABLE 2

| Feature | weight β |
|---|---|
| Proportion of indels with micro-homology | 2.398 |
| Number of base substitutions of signature 3 | 1.611 |
| Number of rearrangement signature 5 rearrangements | 0.847 |
| HRD index | 0.667 |
| Number of rearrangement signature 3 rearrangements | 1.153 |
| Number of base substitutions of signature 8 | 0.091 |

For embodiments wherein the features consist of a subset of the six features set out above, the vector of weights $\beta$ may be as set out below in Table 3, or within a variation of ±10%, preferably ±5% of these weights:

TABLE 3

| Feature 1 | Weight | Feature 2 | Weight |
|---|---|---|---|
| Number of base substitutions of signature 3 | 2.371 | Number of rearrangement signature 3 rearrangements | 1.835 |
| Number of base substitutions of signature 3 | 1.876 | Number of rearrangement signature 5 rearrangements | 2.989 |
| Number of base substitutions of signature 3 | 2.931 | Proportion of indels with micro-homology | 3.984 |
| Number of base substitutions of signature 3 | 2.429 | HRD index | 2.051 |

TABLE 3-continued

| Feature 1 | Weight | Feature 2 | Weight |
|---|---|---|---|
| Number of rearrangement signature 3 rearrangements | 3.559 | Proportion of indels with micro-homology | 4.819 |
| Number of rearrangement signature 3 rearrangements | 1.650 | HRD index | 1.895 |
| Number of rearrangement signature 3 rearrangements | 2.297 | Number of base substitutions of signature 8 | 0.676 |
| Number of rearrangement signature 5 rearrangements | 3.026 | Proportion of indels with micro-homology | 1.933 |
| Number of rearrangement signature 5 rearrangements | 3.715 | HRD index | 1.017 |
| Proportion of indels with micro-homology | 2.523 | HRD index | 1.894 |
| Proportion of indels with micro-homology | 3.223 | Number of base substitutions of signature 8 | 0.807 |
| HRD index | 2.813 | Number of base substitutions of signature 8 | 0.357 |

The step of identifying may include comparing said score to a predetermined threshold and performing said identification based on said comparison. The threshold may be set based on clinical parameters. For example, the weighted score may be compared to a threshold and, from that comparison, a clinical decision as to how to treat a tumour from which the DNA sample was taken can be made.

The method of the present aspect may include any combination of some, all or none of the above described preferred and optional features.

Further aspects of the present invention include computer programs for running on computer systems which carry out the method of the above aspect, including some, all or none of the preferred and optional features of that aspect.

A further aspect of the present invention provides a computer program product containing non-transitory memory storing a computer program which, when run on a computer, performs the steps of: determining the presence or absence of a plurality of base substitution signatures, rearrangement signatures and indel signatures in a DNA sample obtained from a tumour and determining the copy number profiles for the sample; generating, from the presence or absence of a plurality of base substitution signatures, rearrangement signatures and indel signatures in the sample and the copy number profiles for the sample, a probabilistic score; and based on said probabilistic score, identifying whether said sample has a high or low likelihood of being homologous recombination (HR)-deficient.

A further aspect of the present invention provides a computer having a processor, wherein the processor is configured to: determine the presence or absence of a plurality of base substitution signatures, rearrangement signatures and indel signatures in a DNA sample obtained from a tumour and determining the copy number profiles for the sample; generate, from the presence or absence of a plurality of base substitution signatures, rearrangement signatures and indel signatures in the sample and the copy number profiles for the sample, a probabilistic score; and based on said probabilistic score, identify whether said sample has a high or low likelihood of being homologous recombination (HR)-deficient.

The computer program and the processor of the above two aspects may also carry out some or all of the optional or preferred steps described above in relation to the first aspect.

A further aspect of the present invention provides a method of predicting whether a patient with cancer is likely to respond to a PARP inhibitor or a platinum-based drug or an anthracycline, the method comprising characterising a sample obtained from a tumour in the patient as having a high or low likelihood of being homologous recombination (HR)-deficient using a method according to the above described first aspect, including some, all or none of the optional or preferred steps of that aspect, wherein if the sample is characterised as having a high likelihood of being HR-deficient, the patient is likely to respond to a PARP inhibitor or a platinum-based drug or an anthracycline.

A further aspect of the present invention provides a method of selecting a patient having cancer for treatment with a PARP inhibitor or a platinum-based drug or an anthracycline, the method comprising the method comprising characterising a sample obtained from a tumour in the patient as having a high or low likelihood of being homologous recombination (HR)-deficient using a method according to the above described first aspect, including some, all or none of the optional or preferred steps of that aspect, and selecting the patient for treatment with a PARP inhibitor or a platinum-based drug or an anthracycline if the sample is characterised as having a high likelihood of being HR-deficient.

A further aspect of the present invention provides a PARP inhibitor or a platinum-based drug or an anthracycline for use in a method of treatment of cancer in a patient from whom a DNA sample has been obtained and the DNA sample has been characterised by a method according to the above described first aspect, including some, all or none of the optional or preferred steps of that aspect, as having a high likelihood of being HR-deficient.

A further aspect of the present invention provides a method of treating cancer in a patient determined to have a tumour with a high likelihood of being HR-deficient, wherein the likelihood of the tumour being HR-deficient is determined by characterising a DNA sample obtained from the tumour using a method according to the above described first aspect, including some, all or none of the optional or preferred steps of that aspect.

A further aspect of the present invention provides a PARP inhibitor or a platinum-based drug or an anthracycline for use in a method of treatment of cancer in a patient, the method comprising: (i) determining whether a DNA sample obtained from said patient has a high or low likelihood of being HR-deficient using a method according to the above described first aspect, including some, all or none of the optional or preferred steps of that aspect; and (ii) administering the PARP inhibitor or a platinum-based drug or an anthracycline to a patient if the DNA sample is determined to have a high likelihood of being HR-deficient.

A further aspect of the present invention provides a method of predicting whether a patient with cancer is likely to respond to an agent that targets DNA repair pathways or which causes DNA damage, the method comprising characterising a sample obtained from a tumour in the patient as having a high or low likelihood of being homologous recombination (HR)-deficient using a method described herein, wherein if the sample is characterised as having a high likelihood of being HR-deficient, the patient is likely to respond to an agent that targets DNA repair pathways or which causes DNA damage.

A further aspect of the present invention provides a method of selecting a patient having cancer for treatment with an agent that targets DNA repair pathways or which causes DNA damage, the method comprising the method comprising characterising a sample obtained from a tumour in the patient as having a high or low likelihood of being homologous recombination (HR)-deficient using a method described herein, and selecting the patient for treatment with an agent that targets DNA repair pathways or which causes DNA damage if the sample is characterised as having a high likelihood of being HR-deficient.

A further aspect of the present invention provides an agent that targets DNA repair pathways or which causes DNA damage for use in a method of treatment of cancer in a patient from whom a DNA sample has been obtained and the DNA sample has been characterised by a method described herein as having a high likelihood of being HR-deficient.

A further aspect of the present invention provides an agent that targets DNA repair pathways or which causes DNA damage for use in a method of treatment of cancer in a patient, the method comprising: (i) determining whether a DNA sample obtained from said patient has a high or low likelihood of being HR-deficient using a method described herein; and (ii) administering the an agent that targets DNA repair pathways or which causes DNA damage to a patient if the DNA sample is determined to have a high likelihood of being HR-deficient.

These and other aspects of the invention are described in further detail below.

Uses of Predictor Outcome

Cancer patients from which a tumour sample is predicted to be BRCA deficient are likely to have a failure of DNA double strand repair by homologous recombination and to be susceptible to drugs that generate double strand breaks, e.g. a PARP inhibitor or a platinum-based drug or an anthracycline.

The enzyme poly ADP ribose polymerase (PARP1) is a protein that is important for repairing single-strand breaks, also known as 'nicks'. If such nicks persist unrepaired until DNA is replicated then the replication itself can cause formation of multitude of double strand breaks. Drugs that inhibit PARP1 cause large amounts of double strand breaks. In tumours with failure of double-strand DNA break repair by error-free homologous recombination, the inhibition of PARP1 results in inability to repair these double strand breaks and leads to the death of the tumour cells. The PARP inhibitor for use in the present invention is preferably a PARP1 inhibitor. Examples of PARP inhibitors include: Iniparib, Talazoparib, Olaparib, Rucaparib, and Veliparib.

Platinum-based antineoplastic drugs are chemotherapeutic agents used to treat cancer. They are coordination complexes of platinum that cause crosslinking of DNA as monoadduct, interstrand crosslinks, intrastrand crosslinks or DNA protein crosslinks. Mostly they act on the adjacent N-7 position of guanine, forming 1, 2 intrastrand crosslink. The resultant crosslinking inhibits DNA repair and/or DNA synthesis in cancer cells. Some commonly used platinum-based antineoplastic drugs include: cisplatin, carboplatin, oxaliplatin, satraplatin, picoplatin, Nedaplatin, Triplatin, and Lipoplatin.

Anthracyclines are commonly-used chemotherapeutic agents used to treat various cancers. Generally their mechanisms of action include: a) inhibition of DNA and RNA synthesis by intercalating between base pairs of the strands, thus preventing replication; b) blocking DNA transcription and replication by inhibition of topoisomerase II. Examples of commonly used anthracyclines are doxorubicin, epirubicin, daunorubicin, idarubicin, nemorubicin, pixantrone, sabarubicin and valrubicin The invention also relates to the treatment of cancer with a PARP inhibitor or a platinum-based drug or an anthracycline in a patient having a tumour identified as BRCA deficient by the above method.

For example, the PARP inhibitor or platinum-based drug or anthracycline may be for use in a method of treatment of cancer in a patient having a tumour identified as BRCA deficient by the above method. Prior to treatment, the method may comprise the step of predicting whether the tumour is BRCA proficient or deficient based on DNA samples obtained from said patient. Preferably, these are whole genome samples and the somatic mutations which underly the inputs to the prediction tools described herein may be determined by whole genome sequencing. The DNA samples may be whole-exome samples and somatic mutations which underly the inputs to the prediction tools described herein may be determined by whole exome sequencing.

The DNA samples are preferably obtained from both tumour and normal tissues obtained from the patient, e.g. blood sample from the patient and tumour tissue obtained by a biopsy. Somatic mutations in the tumour sample are detected, standardly, by comparing its genomic sequences with the one of the normal tissue.

The method of treatment comprises the step of administering the PARP inhibitor or platinum-based drug or anthracycline to a cancer patient having a tumour predicted to be BRCA deficient. Any suitable route of administration may be used.

The patient to be treated is preferably a human patient.

Genomic Profiling to Distinguish BRCA1/2 Deficient Vs BRCA1/2 Proficient Cancers It has previously been reported that tumours associated with BRCA1 or BRCA2 germline mutations with somatic inactivation of the wild-type allele, have a distinguishing genomic profile characterised by greater numbers of mutations overall, an excess of base substitution Signatures 3 or 8, an excess of large deletions (>3 bp) with microhomology at the junction of the indel, Rearrangement Signatures 5 and copy number profiles associated with widespread loss of heterozygosity.

Additionally, BRCA1 null tumours also had an excess of Rearrangement Signatures 3 mainly, and sometimes of Rearrangement Signature 1. In contrast, typical ER positive tumours had fewer mutations, Signatures 1 and 5, few indels, few rearrangements and typical copy number aberrations including 1 q gain and 16 q loss.

Within the WGS for the 560 breast cancers referred to above, the inventors identified 77 breast cancers that were genetically null for BRCA1 or BRCA2, and 274 clear BRCA1/2 proficient sporadic tumours as a training set, and quantitatively sought defining features of BRCA-ness.

A lasso logistic regression model was used on all genomic parameters identified as contributing to BRCA-ness, including base substitution, indel, rearrangement and copy number signatures on the training set.

Six distinguishing parameters were individually found to convey the greatest variance between the datasets. Ranked by decreasing influence, these were: microhomology-mediated indels, base substitution signature 3, rearrangement signature 5, HRD index, rearrangement signature 3, base substitution signature 8.

The inventors were thus able to develop a flexible, weighted model using the genomic parameters identified in the training set, in order to score BRCA-ness for each sample as described in more detail below.

Compared to the existing methods of determining whether a DNA sample is HR-deficient or not (sequencing the BRCA1/BRCA2 genes or looking for promoter hypermethylation), this model was able to correctly identify a much larger number of tumours as HR-deficient. Within the 560 whole genomes studied, 23 women with evidence of complete abrogation of the BRCA1/BRCA2 proteins in their tumours were known to have inherited mutations in these genes, prior to being recruited to this study. Using the model according to an embodiment of the present invention, the inventors were able to identify a further 35 women with inherited mutations in BRCA1/BRCA2 and an additional 59 women were predicted to have a high likelihood of having HR-deficient tumours where there had been no previous indication of this.

Prediction of DNA from a Tumour Sample as BRCA Deficient or Proficient

To develop and determine the weights for the various base substitution, rearrangement and indel signatures and HRD index, the somatic mutations from DNA samples from the WGS were processed by the methods described above (or other methods) to determine the presence or absence of signatures for substitutions, rearrangements and indels and thus the number of mutations attributed to each of these signatures in each sample. Together with the HRD score, these "features" are the inputs to the prediction stage which is described in relation to the embodiments below.

This "training" stage was applied to all the available parameters (i.e. all twelve relevant base substitution signatures, both indel signatures and all six rearrangement signatures and the HRD index). By applying the log transformation and lasso logistic regression model described below to the 560 WGS dataset, the model learned the parameters that were informative and learned the weights of each of those parameters based on samples that were known to be BRCA1/BRCA2 null (HR-deficient) at the tumour level when compared to breast cancer samples that were known to be sporadic and non-HR deficient.

Each of the inputs (the number of mutations attributed to the particular base substitution, indel and rearrangement signatures and HRD index) was log-transformed, according to the formula:

$$x' = \ln(x+1)$$

The log-transformed data were normalised across all data for that feature:

$$x'' = \frac{x' - \mathrm{mean}(x')}{sd(x')}$$

The data were parsed through a regression shrinkage and selection model via a lasso approach where all $\beta$ weights are constrained to be positive because they reflect the biological presence of a mutational process—in this case HR deficiency. Multiple mutational processes can exist in a tumour, and in some cases, certain hypermutator mutational phenotypes can come to dominate a specific cancer and eclipse the appreciation of other mutational processes. Thus, a model constrained to positive weights permits the detection of a mutational process, no matter how nominal it may be in a particular patient.

The parameters for logistic regression are obtained by maximising the penalised likelihood of the training data. The penalised likelihood function is:

$$\min_{(\beta_0, \beta) \in \mathbb{R}^{p+1}} \left( -\left[ \frac{1}{N} \sum_{i=1}^{N} y_i \cdot (\beta_0 + x_i^T \beta) - \log\left(1 + e^{(\beta_0 + x_i^T \beta)}\right) \right] + \lambda \|\beta\|_1 \right)$$

where $\beta_0$ is the intercept, equivalent to the background log-odds of BRCAness $\beta$ is a vector of weights with one real value corresponding to each feature p is the number of features characterising each sample N is the number of samples $x_i^T$ is the vector of features characterising ith sample $\lambda$ is the penalty (real value) promoting the sparseness of the weights $\|\beta\|_1$ is the L1 norm of the vector of weights, ie. the sum of absolute values of all entries of the weights vector The robustness of the beta weights selected for the classifier were tested using a ten-fold nested cross-validation technique. The final coefficients and parameters that were derived and used in the classifier are set out in Table 4 below:

TABLE 4

| Feature | Feature ID | weight β | Mean (weight β) | S. dev. (weight β) |
|---|---|---|---|---|
| Proportion of indels with micro-homology | del.mh.prop | 2.129 | 2.21 | 0.36 |
| Number of base substitutions of signature 3 | subs.3 | 1.239 | 1.52 | 0.25 |
| Number of rearrangement signature 5 rearrangements | RS5 | 0.978 | 0.91 | 0.06 |
| HRD index | hrd | 0.613 | 0.82 | 0.14 |
| Number of rearrangement signature 3 rearrangements | RS3 | 0.588 | 1.05 | 0.25 |
| Number of base substitutions of signature 8 | subs.8 | 0.444 | 0.30 | 0.19 |

In an alternative approach to training, the above process was performed on a different training set of samples from the 560 WGS dataset, and with the same set of 77 samples which had been identified as BRCA 1/2 deficient (HR-deficient) but with a more refined selection of the BRCA 1/2 proficient (HR-proficient) samples. The final coefficients and parameters that were derived from this dataset and can alternatively be used in the classifier are set out in Table 5 below:

TABLE 5

| Feature | Feature ID | weight β | Mean (weight β) | S. dev. (weight β) |
|---|---|---|---|---|
| Proportion of indels with micro-homology | del.mh.prop | 2.398 | 2.29 | 0.40 |
| Number of base substitutions of signature 3 | subs.3 | 1.611 | 1.58 | 0.21 |

TABLE 5-continued

| Feature | Feature ID | weight β | Mean (weight β) | S. dev. (weight β) |
|---|---|---|---|---|
| Number of rearrangement signature 5 rearrangements | RS5 | 0.847 | 0.88 | 0.16 |
| HRD index | hrd | 0.667 | 0.54 | 0.10 |
| Number of rearrangement signature 3 rearrangements | RS3 | 1.153 | 1.06 | 0.28 |
| Number of base substitutions of signature 8 | subs.8 | 0.091 | 0.05 | 0.08 |

Prediction Using Smaller Selection of Factors

The inventors also tested the ability of a deliberately restricted subset of the available parameters to provide useful prediction. To test this, the log transformation and lasso logistic regression model described above was applied to the 560 WGS dataset but only in respect of limited subsets of the above parameters. In particular, it was tested whether combinations or 2 or more categories of parameter selected from: the relevant base substitution signatures, the rearrangement signatures, the indel signatures and the HRD index.

From each of these subsets, the model learned the parameters that were informative and learned the weights of each of those parameters based on samples that were known to be BRCA1/BRCA2 null (HR-deficient) at the tumour level when compared to breast cancer samples that were known to be sporadic and non-HR deficient.

From this learning process, good predictive ability (albeit not as good as found using all available parameters) was found for combinations of 2 or more of: base substitution signatures, rearrangement signatures, indel signatures and the HRD index. The final coefficients and parameters that were derived and used in the classifier in each of these combinations are set out in Table 6 below.

TABLE 6

| Feature 1 | Weight | Feature 2 | Weight |
|---|---|---|---|
| Number of base substitutions of signature 3 | 2.371 | Number of rearrangement signature 3 rearrangements | 1.835 |
| Number of base substitutions of signature 3 | 1.876 | Number of rearrangement signature 5 rearrangements | 2.989 |
| Number of base substitutions of signature 3 | 2.931 | Proportion of indels with micro-homology | 3.984 |
| Number of base substitutions of signature 3 | 2.429 | HRD index | 2.051 |
| Number of rearrangement signature 3 rearrangements | 3.559 | Proportion of indels with micro-homology | 4.819 |
| Number of rearrangement signature 3 rearrangements | 1.650 | HRD index | 1.895 |
| Number of rearrangement signature 3 rearrangements | 2.297 | Number of base substitutions of signature 8 | 0.676 |

TABLE 6-continued

| Feature 1 | Weight | Feature 2 | Weight |
|---|---|---|---|
| Number of rearrangement signature 5 rearrangements | 3.026 | Proportion of indels with micro-homology | 1.933 |
| Number of rearrangement signature 5 rearrangements | 3.715 | HRD index | 1.017 |
| Proportion of indels with micro-homology | 2.523 | HRD index | 1.894 |
| Proportion of indels with micro-homology | 3.223 | Number of base substitutions of signature 8 | 0.807 |
| HRD index | 2.813 | Number of base substitutions of signature 8 | 0.357 |

To determine the applicability of these combinations as useful predictors of whether a sample from a single tumour is BRCA proficient or deficient, the sensitivity of each of the above combinations of features and weights was calculated, based on a threshold of a probabilistic score of 0.7 indicating that the sample was BRCA deficient. The results are shown in Table 7 below. For comparison, Table 7 also shows the sensitivity of the 6 feature combination described above, as well as each of the individual features when taken alone.

TABLE 7

| Feature 1 | Weight | Feature 2 | Weight | Area under curve (ROC) | Sensitivity at 0.7 cut-off |
|---|---|---|---|---|---|
| HRDetect (all 6 features identified above) | NA | NA | NA | 0.984 | 0.987 |
| Number of base substitutions of signature 3 | 2.676 | NA | NA | 0.939 | 0.935 |
| Number of rearrangement signature 3 rearrangements | 2.308 | NA | NA | 0.874 | 0.610 |
| Number of rearrangement signature 5 rearrangements | 4.455 | NA | NA | 0.947 | 0.753 |
| Proportion of indels with micro-homology | 3.386 | NA | NA | 0.946 | 0.753 |
| HRD index | 2.842 | NA | NA | 0.913 | 0.584 |
| Number of base substitutions of signature 8 | 0.685 | NA | NA | 0.761 | 0 |
| Number of base substitutions of signature 3 | 2.294 | Number of rearrangement signature 3 rearrangements | 1.662 | 0.970 | 0.831 |
| Number of base substitutions of signature 3 | 1.876 | Number of rearrangement signature 5 rearrangements | 2.989 | 0.968 | 0.922 |
| Number of base substitutions of signature 3 | 2.931 | Proportion of indels with micro-homology | 3.984 | 0.980 | 0.896 |
| Number of base substitutions of signature 3 | 2.359 | HRD index | 1.920 | 0.974 | 0.870 |
| Number of rearrangement signature 3 rearrangements | 3.514 | Proportion of indels with micro-homology | 4.758 | 0.982 | 0.896 |
| Number of rearrangement signature 3 rearrangements | 1.691 | HRD index | 1.939 | 0.944 | 0.649 |
| Number of rearrangement signature 3 rearrangements | 2.225 | Number of base substitutions of signature 8 | 0.627 | 0.904 | 0.597 |
| Number of rearrangement signature 5 rearrangements | 3.364 | Proportion of indels with micro-homology | 2.108 | 0.974 | 0.883 |
| Number of rearrangement signature 5 rearrangements | 3.963 | HRD index | 1.118 | 0.957 | 0.805 |
| Number of rearrangement signature 5 rearrangements | 4.420 | Number of base substitutions of signature 8 | 0 | 0.947 | 0.753 |
| Proportion of indels with micro-homology | 2.498 | HRD index | 1.870 | 0.964 | 0.818 |
| Proportion of indels with micro-homology | 3.375 | Number of base substitutions of signature 8 | 0.896 | 0.951 | 0.792 |
| HRD index | 2.748 | Number of base substitutions of signature 8 | 0.335 | 0.917 | 0.571 |

Prediction of BRCA Proficient or Deficient DNA from Individual Samples

In embodiments of the present invention, a prediction of whether a DNA sample from a tumour of a single patient is BRCA proficient or deficient is performed. In these embodiments, this prediction is performed by a computer-implemented method or tool that takes as its inputs the relative presence or absence of base substitution and rearrangement signatures, microhomology-mediated indels and the HRD copy number-based index in that DNA sample.

In a development of this embodiment, the computer-implemented method or tool may take as its inputs a list of somatic mutations generated through high-coverage or low-pass sequencing of nucleic acid material obtained from fresh-frozen derived DNA, circulating tumour DNA or formalin-fixed paraffin-embedded (FFPE) DNA representative of a suspected or known tumour from a patient. These somatic mutations can then be analysed to determine the relative presence or absence of base substitution and rearrangement signatures, microhomology-mediated indels and the HRD copy number-based index.

The determination of the relative presence or absence of base substitution signatures can be performed by a method such as that described in Alexandrov et al., (Nat. Commun., 2015; [17].

The number of somatic mutations associated with a consensus signature (also referred to as "contribution" or "exposure" to a mutational signature) is calculated as follows. Each mutational signature i is represented as a vector $P_i$ that is a discrete probability density function comprising 96 non-negative components ($P_i^1 \ldots P_i^{96}$) each corresponding to a mutation type, where a mutation type is defined by the mutated base and the base immediately 5' ad 3' to each mutation. The contributions of each of a plurality of consensus mutational signatures (Q) including mutational processes known to be operative in the cancer type of the examined sample are determined together by finding the minimum of the Frobenius norm of a constrained linear function:

$$\min \left\| \vec{M} - \sum_{i=1}^{q} (\vec{S}_i x E_i) \right\|_2^F$$

for a set of vectors $S_{1,\ldots,q}$ belonging to the subset Q, where Q comprises the selected mutational signatures $P_i$ (each $\vec{S}_i$ representing a vector with 96 non-negative components reflecting a selected mutational signature), $\vec{M}$ representing the mutational catalogue of the examined sample, and $E_i$ representing the number of mutations in each category associated with mutational signature i in the mutational catalogue. The minimization of the above equation is performed under the constraints that the number of somatic mutations contributed by a mutational signature in a sample must be non-negative and it must not exceed the total number of somatic mutations in that sample. Furthermore, the mutations contributed by all signatures in a sample must equal the total number of somatic mutations of that sample.

The determination of the relative presence or absence of rearrangement signatures can be performed by a method such as that described in the PCT patent application no. PCT/EP2017/0602709, published as WO 2017/191068, which was filed on the same day as the present application and is hereby incorporated by reference.

The determination of the presence or absence of microhomology-mediated indels (also called "microhomology-mediated deletions" as, of the overall range of insertions and deletions, only deletions are ever classified as microhomology-mediated) can be performed as follows. In particular, a list of somatic rearrangements is used to generate a rearrangement mutational catalogue for a sample to be analysed, and the contributions of known rearrangement signatures to said rearrangement catalogue is determined by computing the cosine similarity between the rearrangement mutations in said catalogue and the rearrangement mutational signatures. The rearrangement catalogue and the signatures are based on a classification of rearrangement mutations as: (i) being clustered or non-clustered, (ii) being one of tandem duplications, deletions, inversions or translocations, and (iii) grouping mutations identified as tandem duplications, deletions or inversions by size (e.g. 1-10 kb, 10-100 kb, 100 kb-1 Mb, 1 Mb-10 Mb, and >10 Mb). The number of rearrangements $E_i$ associated with the ith mutational signature $\vec{S}_i$ in the DNA sample is determined as proportional to the cosine similarity ($\vec{C}_i$) between the catalogue of this sample $\vec{M}$ and $\vec{S}_i$:

$$\vec{C}_i = \frac{\vec{S}_i \cdot \vec{M}}{\|\vec{S}_i\| \|\vec{M}\|}$$

wherein:

$$E_i = \frac{\vec{C}_i}{\sum_{i=1}^{q} \vec{C}_i} \sum_{j=1}^{n} \vec{M}^j$$

wherein $\vec{S}_i$ and $\vec{M}$ are equally-sized vectors with nonnegative components being, respectively, a known rearrangement signature and the mutational catalogue with n subclasses (e.g. n=32 corresponding to the clustered/non-clustered characteristic and the type and size of the rearrangements) and q is the number of signatures in said plurality of known rearrangement signatures. The number of somatic rearrangements contributed by a rearrangement signature in a sample must be nonnegative and it must not exceed the total number of somatic mutations in that sample. Furthermore, the mutations contributed by all signatures in a sample must equal the total number of somatic mutations of that sample. These constraints can be mathematically expressed as $$0 \leq E_i \leq \|\vec{S}_i\|_1, i = 1 \ldots q,$$

and $$\sum_{i=1}^{q} E_i = \|\vec{S}_i\|_1.$$

Rearrangement signatures 3 and 5 were identified by analysing rearrangements in a set of complete sequenced genomes of breast cancer tissues by obtaining a catalogue of rearrangements using a 32 subclasses rearrangement classification as explained above and feeding this into a latent variable analysis such as NMF to obtain a non-negative vector of 32 elements describing each rearrangement signature. Amongst the resulting 6 signatures, rearrangement Signature 5 was characterised by deletions <100 kb, and Rearrangement Signature 3 was characterised predominantly by tandem duplications <10 kb.

First, indels are identified using cgpPindel, as described in [18] and [19].

For each insertion/deletion (indel), more than or equal to 25 bp of flanking sequence is identified using the Ensembl API.

Only deletions are taken into consideration for the rest of the analysis. If the first few nucleotides but not all of the nucleotides of the deletion motif matches the first few nucleotides of the immediate 3' flanking sequence, then this is referred to as "microhomology-mediated deletion" or "microhomology-mediated indel".

The determination of the HRD copy number-based index is also referred to as the HRD "score" and is the sum of the loss of heterozygosity, telomeric allelic imbalance and large-scale state transitions scores. The process for determining each of these are set out in [14-16]. In particular, Abkevich et al. [15] defines a loss of heterozygosity score as the number of loss of heterozygosity regions >15 Mb but less than a whole chromosome. Birkbak et al. [14] defines a telomeric imbalance score as the number of regions with telomeric imbalance, defined as contiguous regions of allelic imbalance that extend to one of the subtelomeres but do not cross the centromere. Popova et al. [16] defines a large-scale state transition score as the number of chromosomal breaks between adjacent regions of at least 10 Mb. The HRD score is an integer ranging between 0-50.

Figure 1:
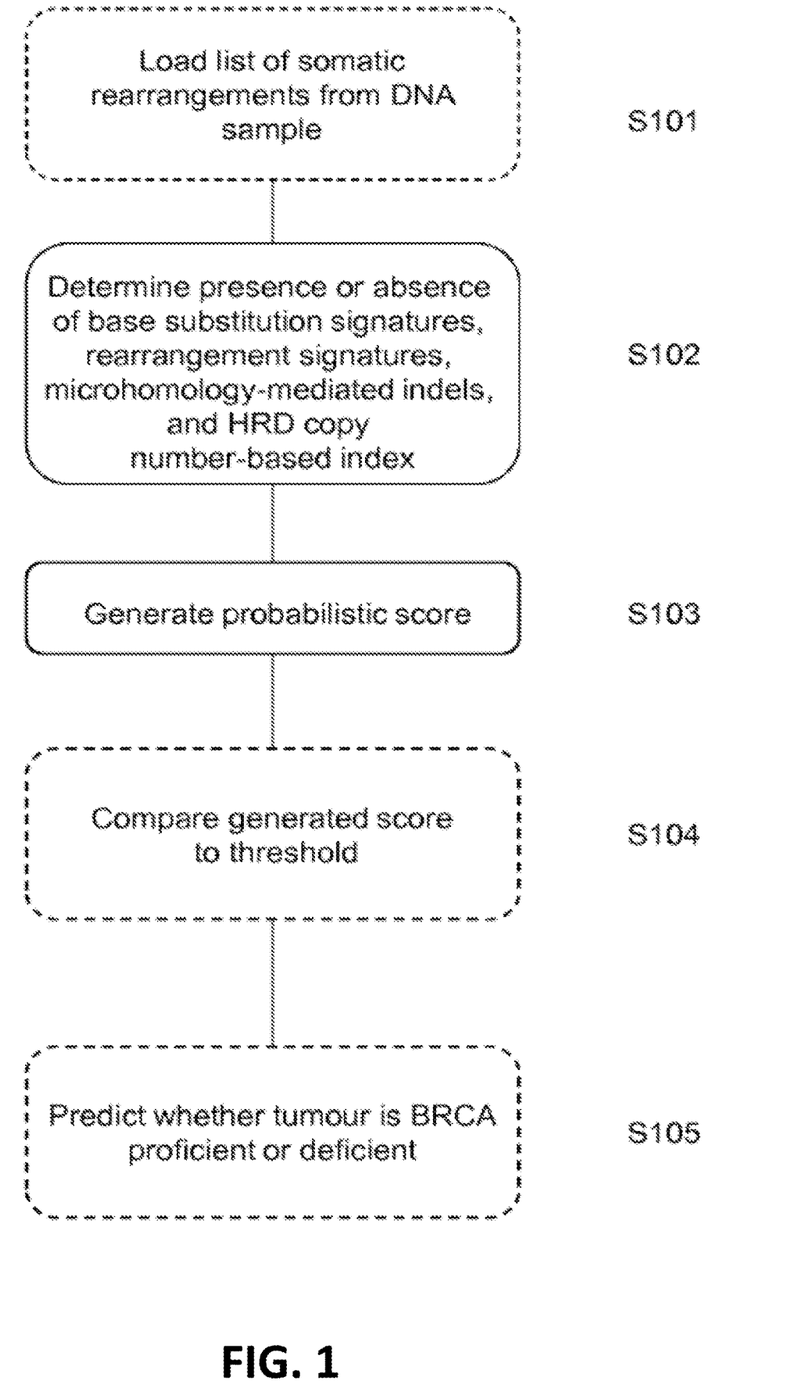
FIG. 1 is a flow diagram showing, in schematic form, a method of characterising a DNA sample according to an embodiment of the present Invention.

The steps of this method are illustrated schematically in FIG. 1. First the somatic mutations from the DNA sample are optionally loaded (S101) and then processed by the methods described above (or other methods) to determine the inputs to the predictor (S102). Once the presence or absence of signatures for substitutions, rearrangements and indels have been obtained, the number of mutations attributed to each of these signatures in the sample is determined. Together with the HRD score, these "features" are the inputs to the prediction stage.

The predictor generates a weighted score from those inputs (S103) which is calculated as follows.

Each of the inputs (the number of mutations attributed to the particular base substitution, indel and rearrangement signatures and HRD index) is log-transformed, according to the formula:

$$x' = \ln(x+1)$$

The log-transformed data are normalised using the mean and standard deviation for that feature shown in Table 2 above $$x'' = \frac{x' - \text{mean}(x')}{sd(x')}$$

The normalised score is then used to determine a probability that the sample is BRCA deficient:

$$P(C_i = BRCA) = \frac{1}{1 + e^{-(\beta_0 + x_i^T \beta)}}$$

where
$C_i$ is the variable encoding the status of $i^{th}$ sample
$\beta_0$ is the intercept, equivalent to the background log-odds of BRCAness
$x_i^T$ is the vector encoding features of $i^{th}$ sample
$\beta$ is the vector of weights The probability from this step can then be used to inform clinical decisions which may be taken based on the likelihood that the tumour is BRCA deficient.

For example, the weighted score may be compared to a threshold (S104) and, from that comparison, a clinical decision as to whether the tumour from which the DNA sample was taken is BRCA proficient or deficient can be made (S105).

The clinical decision may include the suitability of the tumour for particular courses of treatment, for example, treatment with PARP inhibitors or platinum therapy as discussed above.

Clinical Testing

To investigate the potential clinical utility of methods according to the above embodiments, the methods were carried out on DNA samples from small needle biopsy samples, rather than post-operatively on large specimens.

Figure 2:
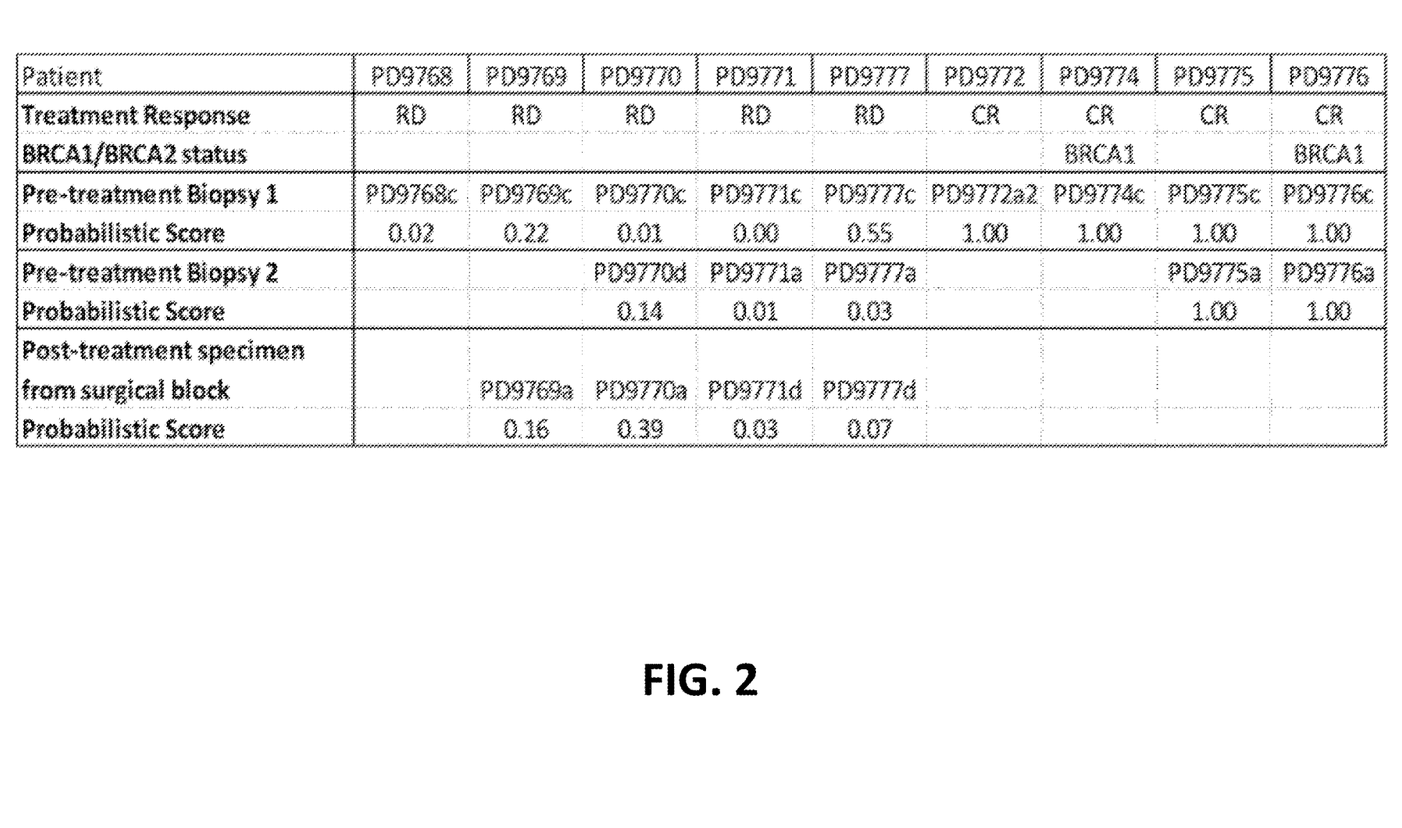
FIG. 2 is a table showing the response of 9 patients to treatment with anthracyclines and the associated predictions using methods according to embodiments of the present invention.

18 DNA samples (14 needle biopsies and four post-operative tumour block specimens) were obtained from nine patients with triple negative tumours that were treated with neoadjuvant anthracyclines+/− taxanes [20]. Although a different compound from PARP inhibitors, sensitivity to anthracyclines has been reported for tumours that show BRCA1/BRCA2 deficiency [21, 22]. FIG. 2 shows the results of applying the above methods for these nine patients. Duplicate pretreatment needle biopsy samples were available for five of the samples (Pre-treatment Biospy 1 and 2). One patient (PD9770) had multifocal tumours. One patient with extremely low tumour cellularity in both biopsies and with hardly any mutations was excluded (PD9773). Probabilistic scores obtained from the methods set out above are provided under each sample.

Four patients demonstrated complete responses to treatment and all had high probabilities of being BRCA deficient using the methods set out above. Two were confirmed to be germline BRCA1 mutation carriers and two were sporadic tumours as shown in FIG. 2. By contrast, five patients that exhibited residual disease had low probabilities of being BRCA deficient using the methods set out above. Furthermore, the methods set out above performed consistently in independent biopsies per patient, and between biopsy and post-operative specimen per patient, without exception.

Although the numbers are small, these analyses suggest that methods according to embodiments of the present invention are able to distinguish therapeutic sensitivity as early in the patient's clinical journey as the first biopsy. Moreover, they suggest that these methods are robust between biopsies/specimens. Larger clinical trials are clearly necessary to fully understand how this predictor will perform when applied to breast cancer diagnostics in general.

Further Information

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

PCT Patent Application No. PCT/EP2017/0602709 (WO 2017/191068)

The present disclosure may be further understood in view of the following, which corresponds to the indicated sections of PCT Patent Application No. PCT/EP2017/0602709 (WO 2017/191068). The text is reproduced here verbatim.

WO 2017/191068—Page 4

For example, the filtering may use a list of known germline rearrangement or copy number polymorphisms and remove somatic mutations resulting from those polymorphisms from the catalogue prior to determining the contributions of the rearrangement signatures.

As a further example, the filtering may use BAM files of unmatched normal human tissue sequenced by the same process as the DNA sample and discards any somatic mutation which is present in at least two well-mapping reads in at least two of said BAM files. This approach can remove artefacts resulting from the sequencing technology used to obtain the sample.

The classification of the rearrangement mutations may include identifying mutations as being clustered or non-clustered. This may be determined by a piecewise-constant fitting ("PCF") algorithm which is a method of segmentation of sequential data. In particular embodiments, rearrangements may be identified as being clustered if the average density of rearrangement breakpoints within a segment is a certain factor greater than the whole genome average density of rearrangements for an individual patient's sample. For example the factor may be at least 8 times, preferably at least 9 times and in particular embodiments is 10 times. The inter-rearrangement distance is the distance from a rearrangement breakpoint to the one immediately preceding it in the reference genome. For any given breakpoint, this measurement is already known.

The classification of the rearrangement mutations may include identifying rearrangements as one of: tandem duplications, deletions, inversions or translocations. Such classifications of rearrangement mutations are already known.

The classification of the rearrangement mutations may further include grouping mutations identified as tandem duplications, deletions or inversions by size. For example, the mutations may be grouped into a plurality of size groups by the number of bases in the rearrangement. Preferably the size groups are logarithmically based, for example 1-10 kb, 10-100 kb, 100 kb-1 Mb, 1 Mb-10 Mb and greater than 10 Mb. Translocations cannot be classified by size.

In particular embodiments, in each DNA sample the number of rearrangements $E_i$ associated with the i th mutational signature $\vec{S}_i$ is determined as proportional to the cosine similarity ($\vec{C}_i$) between the catalogue of this sample $\vec{M}$ and $\vec{S}_i$:

wherein:

$$\vec{C}_i = \frac{\vec{S}_i \cdot \vec{M}}{\|\vec{S}_i\| \, \|\vec{M}\|}$$

WO 2017/191068—Pages 7-8

The computer program and the processor of the above two aspects may also carry out some or all of the optional or preferred steps described above in relation to the first aspect.

These and other aspects of the invention are described in further detail below.

Identification of Rearrangement Signatures Linked to Cancer

The complete genomes of 560 breast cancers and non-neoplastic tissue from each individual (556 female and four male) were sequenced. 3,479,652 somatic base substitutions, 371,993 small indels and 77,695 rearrangements were detected, with substantial variation in the number of each between individual samples.

To enable investigation of signatures of rearrangement mutational processes, a rearrangement classification was adopted incorporating 32 subclasses.

In many cancer genomes, large numbers of rearrangements are regionally clustered, for example in zones of gene amplification. Therefore, the rearrangements were first classified into those that occurred as clusters or were dispersed, further sub-classified into deletions, inversions and tandem duplications, and then according to the size of the rearranged segment. The final category in both groups was interchromosomal translocations.

Application of the mathematical framework used for base substitution signatures [2, 14, 15] extracted six rearrangement signatures. Unsupervised hierarchical clustering on the basis of the proportion of rearrangements attributed to each signature in each breast cancer yielded seven major subgroups exhibiting distinct associations with other genomic, histological or gene expression features as shown in FIG. 2.

Rearrangement Signature 1 (9% of all rearrangements) and Rearrangement Signature 3 (18% rearrangements) were characterised predominantly by tandem duplications. Tandem duplications associated with Rearrangement Signature 1 were mostly >100 kb, and those with Rearrangement Signature 3<10 kb. More than 95% of Rearrangement Signature 3 tandem duplications were concentrated in 15% of cancers, many with several hundred rearrangements of this type. Almost all cancers (91%) with BRCA1 mutations or promoter hypermethylation were in this group, which was enriched for basal-like, triple negative cancers and copy number classification of a high Homologous Recombination Deficiency (HRD) index [17-19]. Thus, inactivation of BRCA1, but not BRCA2, may be responsible for the Rearrangement Signature 3 small tandem duplication mutator phenotype.

More than 35% of Rearrangement Signature 1 tandem duplications were found in just 8.5% of the breast cancers and some cases had hundreds of these. The cause of this large tandem duplication mutator phenotype is unknown. Cancers exhibiting it are frequently TP53-mutated, relatively late diagnosis, triple-negative breast cancers, showing enrichment for base substitution signature 3 and a high Homologous Recombination Deficiency (HRD) index but do not have BRCA1/2 mutations or BRCA1 promoter hypermethylation.

Rearrangement Signature 5 (accounting for 14% rearrangements) was characterised by deletions <100 kb. It was strongly associated with the presence of BRCA1 mutations or promoter hypermethylation (FIG. 2, Cluster D), BRCA2 mutations (FIG. 2, Cluster G) and with Rearrangement Signature 1 large tandem duplications (FIG. 2, Cluster F).

Rearrangement Signature 2 (accounting for 22% rearrangements) was characterised by nonclustered deletions (>100 kb), inversions and interchromosomal translocations, was present in most cancers but was particularly enriched in ER positive cancers with quiet copy number profiles (FIG. 2, Cluster E, GISTIC Cluster 3). Rearrangement Signature 4 (accounting for 18% of rearrangements) was characterised by clustered interchromosomal translocations while Rearrangement Signature 6 (19% of rearrangements) by clustered inversions and deletions (FIG. 2, Clusters A, B, C).

The methods according to embodiments of the invention set out below determine the presence or absence of a rearrangement signature in DNA samples obtained from a single patient. Preferably, these are whole genome samples and the presence or absence of mutational signatures may be determined by whole genome sequencing.

The DNA samples are preferably obtained from both tumour and normal tissues obtained from the patient, e.g. blood sample from the patient and breast tumour tissue obtained by a biopsy. Somatic mutations in the tumour sample are detected, standardly, by comparing its genomic sequences with the one of the normal tissue.

Method of Detection of Rearrangement Signatures in a Single Patient

In embodiments of the present invention, detection of a rearrangement signature in the DNA obtained from a single patient is performed. In these embodiments, this detection is performed by a computer-implemented method or tool that examines a list of somatic mutations WO 2017/191068—Pages 10-12 normal whole-genomes. The remaining somatic mutations are used to construct the mutational catalogue of the examined sample.

Generating the Mutational Catalogue for a Sample

The list of remaining (i.e., post-filtered) somatic rearrangements is used to generate the rearrangement mutational catalogue of a sample.

(1) Clustered Vs Non-Clustered

The first classification applied to the mutations is whether they are clustered (closely-grouped) or not.

To distinguish collections of rearrangements that are clustered or close together in a patient's cancer genome from other rearrangements that are distributed or dispersed throughout the genome, the data is parsed through a PCF-based algorithm. The PCF (Piecewise-ConstantFitting) algorithm is a method of segmentation of sequential data.

Before applying PCF, a number of steps are performed on the rearrangement data. Unlike substitutions or indels that have a single genomic coordinate to signify their position, rearrangements have two coordinates or "breakpoints" that identify two distant genomic loci that have been brought together by a large structural mutation event.

First, both breakpoints of each rearrangement are treated independently. The breakpoints are then sorted according to reference genomic coordinate in each sample. The intermutation distance (IMD), defined as the number of base pairs from one rearrangement breakpoint to the one immediately preceding it in the reference genome, is calculated for each breakpoint. The calculated IMD is then fed to the PCF algorithm.

To identify regions of "clustered" rearrangements from "non-clustered" rearrangements, a set of rearrangements was required to have an average density of rearrangement breakpoints that was at least 10 times greater than the whole genome average density of rearrangements for an individual patient's sample. Additionally, a gamma parameter (a measure of smoothness of segmentation) was stipulated, $\gamma=25$, and required that a minimum of 10 breakpoints were present in each region, before it could be classified as a cluster of rearrangements. Biologically, the respective partner breakpoint of any rearrangement involved in a clustered region is likely to have arisen at the same mechanistic instant and so can be considered as being involved in the cluster even if located at a distant genomic site according to the reference genome.

Thus rearrangements are first classified as "clustered" or "non-clustered.

(2) Type and Size

In both clustered and non-clustered categories, rearrangements are then classified based on the information provided into the main classes of rearrangements:
    tandem duplications
    deletions
    inversions
    translocations Tandem duplications, deletions and inversions can then be categorised into the following 5 size groups where the size of a rearrangement is obtained through subtracting the lower breakpoint coordinate from the higher one.
    1-10 kb
    10-100 kb
    100 kb-1 Mb
    1 Mb-10 Mb
    >10 Mb Translocations are the exception and cannot be classified by size.

In all, there will be 16 subgroups of clustered and 16 subgroups of non-clustered rearrangements and thus 32 categories altogether. These are listed in Table 1.

The outcome of this classification can then be fed into a latent variable analysis such as NNMF, to obtain a non-negative vector of 32 elements describing each rearrangement signature.

Evaluating the Numbers of Somatic Mutations Attributed to Re-Arrangement Signatures in the Mutational Catalogue of the Examined Sample Calculating the contributions of all mutational signatures is performed by estimating the number of mutations associated to the consensus patterns of the signatures of all operative mutational processes in the sample. Below a method of estimating this using non-negative matrix factorisation (NNMF) is set out, although alternative methods such as EMU or a hierarchical Dirichlet process (HDP) may equally be used.

More specifically, all consensus rearrangement signatures are examined as a set P containing s vectors $$P = \left\{ \begin{bmatrix} p_1^1 \\ \vdots \\ p_1^{32} \end{bmatrix}, \begin{bmatrix} p_2^1 \\ \vdots \\ p_2^{32} \end{bmatrix} \cdots \begin{bmatrix} p_{s-1}^1 \\ \vdots \\ p_{s-1}^{32} \end{bmatrix}, \begin{bmatrix} p_s^1 \\ \vdots \\ p_s^{32} \end{bmatrix} \right\},$$

where each of the vectors is a discrete probability density function reflecting a consensus rearrangement signature. For the currently known rearrangement signatures, these vectors are set out in the respective columns of Table 1. Here, s refers to the number of known consensus rearrangement signatures (currently 6) and the 32 nonnegative components of each vector correspond to the different categories of rearrangements (i.e., clustered/non-clustered, type & size) of these consensus rearrangement signatures.

The contributions of all consensus rearrangement signatures are estimated independently for the mutational catalogue of the examined sample. The estimation algorithm consists of computing the cosine similarity between each signature and examined sample. For a set of vectors $S_{1..q}$, $q \leq s$, the cosine similarity $\vec{C}_i$ is given by:

$$\vec{C}_i = \frac{\vec{S}_i \cdot \vec{M}}{\|\vec{S}_i\| \, \|\vec{M}\|}$$

The number of rearrangements $E_i$ associated with the i th mutational signature $\vec{S}_i$ is proportional to the cosine similarity ($\vec{C}_i$):

$$E_i = \frac{\vec{C_i}}{\sum_{i=1}^{q} \vec{C_i}} \sum_{j=1}^{36} \vec{M}^j$$

wherein $\vec{S_j}$ and $\vec{M}$ are equally-sized vectors with nonnegative components being, respectively, a known rearrangement signature and the mutational catalogue and q is the number of signatures in said plurality of known rearrangement signatures.

In the above equation, $\vec{S}_i$ and $\vec{M}$ represent vectors with 32 nonnegative components (corresponding to the clustered/non-clustered characteristic and the type and size of the rearrangements) reflecting, respectively, a consensus mutational signature and the mutational catalogue of the examined sample. Hence, $\vec{S_j} \in \mathfrak{R}_+^{32}$ while $\vec{M} \in N_0^{32}$. Further, both vectors have known numerical values either from the consensus mutational signatures (i.e., $\vec{S_j}$) or 3. Risch, H. A. et al. Prevalence and penetrance of germline BRCA1 and BRCA2 mutations in a population series of 649 women with ovarian cancer. *American journal of human genetics* 68, 700-710, doi: 10.1086/318787 (2001).
4. Greer, J. B. & Whitcomb, D. C. Role of BRCA1 and BRCA2 mutations in pancreatic cancer. *Gut* 56, 601-605, doi: 10.1136/gut.2006.101220 (2007).
5. Alexandrov, L. B. et al. Signatures of mutational processes in human cancer. *Nature* 500, 415-421, doi: 10.1038/nature12477 (2013).
6. Waddell, N. et al. Whole genomes redefine the mutational landscape of pancreatic cancer. *Nature* 518, 495-501, doi: 10.1038/nature14169 (2015).
7. Merajver, S. D. et al. Somatic mutations in the BRCA1 gene in sporadic ovarian tumours. *Nature genetics* 9, 439-443, doi: 10.1038/ng0495-439 (1995).
8. Miki, Y., Katagiri, T., Kasumi, F., Yoshimoto, T. & Nakamura, Y. Mutation analysis in the BRCA2 gene in primary breast cancers. *Nature genetics* 13, 245-247, doi: 10.1038/ng0696-245 (1996).

| | | | Probability | | | | | |
|---|---|---|---|---|---|---|---|---|
| Type | Class | Size | Signature 1 | Signature 2 | Signature 3 | Signature 4 | Signature 5 | Signature 6 |
| clustered | deletion | 1-10 kb | 0% | 0% | 0% | 1% | 0% | 1% |
| clustered | deletion | 10-100 kb | 0% | 0% | 0% | 1% | 0% | 1% |
| clustered | deletion | 100 kb-1 Mb | 0% | 0% | 0% | 2% | 0% | 3% |
| clustered | deletion | 1 Mb-10 Mb | 0% | 0% | 0% | 3% | 0% | 7% |
| clustered | deletion | >10 Mb | 0% | 0% | 0% | 1% | 0% | 7% |
| clustered | tandem duplication | 1-10 kb | 0% | 0% | 0% | 0% | 0% | 0% |
| clustered | tandem duplication | 10-00 kb | 0% | 0% | 0% | 1% | 0% | 1% |
| clustered | tandem duplication | 100 kb-1 Mb | 1% | 0% | 0% | 1% | 0% | 3% |
| clustered | tandem duplication | 1 Mb-10 Mb | 0% | 0% | 0% | 3% | 0% | 7% |
| clustered | tandem duplication | >10 Mb | 0% | 0% | 0% | 1% | 0% | 7% |
| clustered | inversion | 1-10 kb | 0% | 0% | 0% | 3% | 0% | 2% |
| clustered | inversion | 10-100 kb | 0% | 0% | 0% | 2% | 0% | 2% |
| clustered | inversion | 100 kb-1 Mb | 0% | 0% | 0% | 3% | 0% | 5% |
| clustered | inversion | 1 Mb-10 Mb | 0% | 0% | 0% | 6% | 0% | 15% |
| clustered | inversion | >10 Mb | 0% | 0% | 0% | 2% | 0% | 14% |
| clustered | translocation | | 0% | 0% | 0% | 56% | 0% | 0% |
| non-clustered | deletion | 1-10 kb | 0% | 2% | 2% | 0% | 32% | 3% |
| non-clustered | deletion | 10-100 kb | 1% | 1% | 0% | 0% | 22% | 2% |
| non-clustered | deletion | 100 kb-1 Mb | 4% | 5% | 0% | 0% | 5% | 2% |
| non-clustered | deletion | 1 Mb-10 Mb | 1% | 6% | 0% | 1% | 1% | 2% |
| non-clustered | deletion | >10 Mb | 0% | 6% | 1% | 0% | 1% | 2% |
| non-clustered | tandem duplication | 1-10 kb | 0% | 0% | 53% | 0% | 1% | 0% |
| non-clustered | tandem duplication | 10-100 kb | 16% | 0% | 22% | 0% | 12% | 0% |
| non-clustered | tandem duplication | 100 kb-1 Mb | 54% | 0% | 1% | 0% | 1% | 0% |
| non-clustered | tandem duplication | 1 Mb-10 Mb | 17% | 2% | 0% | 1% | 0% | 1% |
| non-clustered | tandem duplication | >10 Mb | 0% | 5% | 1% | 0% | 1% | 1% |
| non-clustered | inversion | 1-10 kb | 1% | 5% | 1% | 1% | 5% | 1% |
| non-clustered | inversion | 10-100 kb | 2% | 2% | 0% | 0% | 3% | 1% |
| non-clustered | inversion | 100 kb-1 Mb | 2% | 4% | 0% | 0% | 0% | 1% |
| non-clustered | inversion | 1 Mb-10 Mb | 0% | 10% | 0% | 1% | 0% | 4% |
| non-clustered | inversion | >10 Mb | 1% | 12% | 1% | 0% | 2% | 3% |
| non-clustered | translocation | | 1% | 39% | 16% | 7% | 13% | 1% |

WO 2017/191068 - Table 1 (Pages 18-19)

REFERENCES

1. Ford, D. et al. Genetic heterogeneity and penetrance analysis of the BRCA1 and BRCA2 genes in breast cancer families. The Breast Cancer Linkage Consortium. *American journal of human genetics* 62, 676-689 (1998).
2. King, M. C., Marks, J. H., Mandell, J. B. & New York Breast Cancer Study, G. Breast and ovarian cancer risks due to inherited mutations in BRCA1 and BRCA2. *Science* 302, 643-646, doi: 10.1126/science.1088759 (2003).
9. Jackson, S. P. Sensing and repairing DNA double-strand breaks. *Carcinogenesis* 23, 687-696 (2002).
10. Nik-Zainal, S. et al. Mutational processes molding the genomes of 21 breast cancers. *Cell* 149, 979-993, doi: 10.1016/j.cell.2012.04.024 (2012).
11. Walsh, T. et al. Spectrum of mutations in BRCA1, BRCA2, CHEK2, and TP53 in families at high risk of breast cancer. *Jama* 295, 1379-1388, doi: 10.1001/jama.295.12.1379 (2006).
12. Rottenberg, S. et al. High sensitivity of BRCA1-deficient mammary tumors to the PARP inhibitor AZD2281 alone and in combination with platinum drugs. *Proceedings of the National Academy of Sciences of the United States of America* 105, 17079-17084, doi: 10.1073/pnas.0806092105 (2008).
13 Alexandrov, L. B. et al. Deciphering signatures of mutational processes operative in human cancer. *Cell Rep.* 3 (1): 246-59, doi: 10.1016/j.celrep.2012.12.008 (2013)
14 Birkbak, N. J. et al. Telomeric allelic imbalance indicates defective DNA repair and sensitivity to DNA-damaging agents. *Cancer discovery* 2, 366-375, doi: 10.1158/2159-8290.CD-11-0206 (2012).
15 Abkevich, V. et al. Patterns of genomic loss of heterozygosity predict homologous recombination repair defects in epithelial ovarian cancer. *British journal of cancer* 107, 1776-1782, doi: 10.1038/bjc.2012.451 (2012).
16 Popova, T. et al. Ploidy and large-scale genomic instability consistently identify basal-like breast carcinomas with BRCA1/2 inactivation. *Cancer research* 72, 5454-5462, doi: 10.1158/0008-5472.CAN-12-1470 (2012).
17. Alexandrov, L. B. et al. A mutational signature in gastric cancer suggests therapeutic strategies. Nat. Commun. 6:8683 doi: 10.1038/ncomms9683 (2015).
18. Raine, K. M., Hinton, J., Butler, A. P., Teague, J. W., Davies, H., Tarpey, P., Nik-Zainal, S. and Campbell, P. J. 2015. cgpPindel: Identifying somatically acquired insertion and deletion events from paired end sequencing. *Curr. Protoc. Bioinform.* 52:15.7.1-15.7.12. doi: 10.1002/0471250953.bi1507s52.
19. Ye, K., Schulz, M. H., Long, Q., Apweiler, R., and Ning, Z. 2009. Pindel: A pattern growth approach to detect break points of large deletions and medium sized insertions from pairedend short reads. *Bioinformatics* (Oxford, England) 25:2865-2871. doi: 10.1093/bioinformatics/btp394.
20. Yates, L. R. et al. Subclonal diversification of primary breast cancer revealed by multiregion sequencing. *Nat Med* 21, 751-9 (2015).
21. Rodriguez, A. A. et al. DNA repair signature is associated with anthracycline response in triple negative breast cancer patients. *Breast Cancer Res Treat* 123, 189-96 (2010).
22. Chappuis, P. O. et al. A significant response to neoadjuvant chemotherapy in BRCA1/2 related breast cancer. *J Med Genet* 39, 608-10 (2002).

All of the above references are hereby incorporated by reference.

The invention claimed is:

1. A method of treating a cancer patient who has breast cancer, ovarian cancer, or pancreatic cancer, the method comprising:
determining that the cancer patient has a tumour predicted to be homologous recombination (HR)-deficient by a method comprising the following steps:
a) obtaining inputs comprising a whole genome sequence, a whole exome sequence, a somatic rearrangement mutation list identified from a whole genome sequence, or a somatic rearrangement mutations list identified from a whole exome sequence from a sample from the cancer patient;
b) performing the following steps using said inputs:
i) cataloguing the somatic rearrangement mutations in said sample between a plurality of categories defined as: (i) a category of clustered translocations; (ii) a category of non-clustered translocations; (iii) a plurality of categories of clustered tandem duplications grouped by size; (iv) a plurality of categories of non-clustered tandem duplications grouped by size; (v) a plurality of categories of clustered deletions grouped by size; (vi) a plurality of categories of non-clustered deletions grouped by size; (vii) a plurality of categories of clustered inversions grouped by size; (viii) a plurality of categories of non-clustered inversions grouped by size;
ii) determining, using the result of said cataloguing, a number of rearrangement mutations attributed to rearrangement signature 5 and/or rearrangement signature 3 in the sample, wherein rearrangement signatures 3 and 5 are signatures that have been identified by cataloguing somatic rearrangements between said plurality of categories, and wherein rearrangement signature 5 is characterised by a presence of deletions <100 kb and rearrangement signature 3 is characterised by tandem duplications <10 kb; and
iii) determining a proportion of indels with micro homology;
c) generating, from the determinations, a probabilistic score by parsing the results of said determinations through a weighted model trained to apply determined weights to parameters associated with being deficient for BRCA; and
d) predicting that said sample is HR deficient based on a comparison of said probabilistic score to a predetermined threshold; and
administering a PARP inhibitor, a platinum-based drug, or an anthracycline to the cancer patient.

2. The method of claim 1, wherein:
a) the step of determining a number of rearrangement mutations attributed to rearrangement signature 5 and/or a number of rearrangement mutations attributed to rearrangement signature 3 in the sample comprises determining a number of rearrangement mutations attributed to each of a plurality of rearrangement signatures including rearrangement signature 5 and rearrangement signature 3;
b) the step of determining a number of rearrangement mutations attributed to rearrangement signature 5 and/or rearrangement signature 3 in the sample comprises determining a number of rearrangement mutations attributed to each of a plurality of rearrangement signatures consisting of rearrangement signature 5, and rearrangement signature 3 and microhomology-mediated indels; and/or
c) the method for determining that the cancer patient has a tumour predicted to be HR-deficient includes determining a homologous recombination deficiency (HRD) copy number-based index for the sample, wherein the HRD copy number-based index is a sum of a loss of heterozygosity score, a telomeric allelic imbalance score and a large-scale state transition score.

3. The method of claim 2, wherein:
a) the probabilistic score is a weighted score which gives weight to results of the determinations in the following precedence (greatest first): proportion of indels with microhomology, the number of rearrangement mutations attributed to rearrangement signature 5, the HRD copy number-based index, and the number of rearrangement mutations attributed to rearrangement signature 3; or
c) the step of generating a probabilistic score uses a weighted model trained to use the results of said determinations as input variables and to identify weights using said determinations for a plurality of samples comprising samples identified as BRCA1/2 deficient and samples identified as BRCA 1/2 proficient.

4. The method of claim 3, wherein the step of generating the probabilistic score includes the sub steps of:
   a) log-transforming the number of rearrangement mutations attributed to the rearrangement signatures;
   b) normalising the log-transformed number of rearrangement mutations for each rearrangement signature, the proportion of indels with microhomology and the HRD copy number-based index; and
   c) weighting each of said normalised values by a predetermined weighting factor which represents a likelihood of the signature or profile associated with that value causing the tumour to be HR deficient.

5. The method of claim 4, wherein the probabilistic score is generated as $$\frac{1}{1+e^{-(\beta_0+x_i^T\beta)}}$$

where
$\beta_0$ is an intercept weight
$X_i^T$ is a vector encoding the normalized values for the sample; and
$\beta$ is a vector comprising the predetermined weighting factors.

6. The method of claim 2, wherein the weighted model has been trained based on one or more training datasets associated with one or more samples known to be BRCA 1/2 proficient or deficient, wherein training the weighted model includes using a logistic regression model to identify one or more weights associated with one or more of the rearrangement signatures, the proportion of indels with microhomology, and the HRD copy number-based index, and wherein the weighted model is trained to apply the identified weights to one or more samples that have unknown BRCA 1/2 proficient or deficient status.

7. The method of claim 2, further comprising training the weighted model based on one or more training datasets associated with one or more samples known to be BRCA 1/2 proficient or deficient, wherein training the weighted model includes using a logistic regression model to identify one or more weights associated with one or more of the rearrangement signatures, the proportion of indels with microhomology, and the HRD copy number-based index, and wherein the weighted model is trained to apply the identified weights to one or more samples that have unknown BRCA 1/2 proficient or deficient status.

8. The method of claim 1, wherein the number of rearrangement mutations attributed to the rearrangement signatures, and the proportion of indels with microhomology in the sample are determined using data from whole exome sequencing.

9. The method of claim 1, wherein the sample is a tumour biopsy from the cancer patient and/or wherein the method further comprises whole exome sequencing of a normal, non-tumour sample from the cancer patient.

10. The method of claim 1, wherein the step of generating a probabilistic score uses a logistic regression model that uses the results of said determinations as input variables, wherein the logistic regression model comprises weights identified by training the model using said determinations for a plurality of samples comprising samples identified as BRCA1/2 deficient and samples identified as BRCA1/2 proficient, and wherein the weighted model has been trained to apply the identified weights to one or more samples that have unknown BRCA 1/2 proficient or deficient status.

11. The method of claim 1, wherein the cancer patient has breast cancer.

12. The method of claim 1, wherein rearrangement signature 5 and rearrangement signature 3 comprise probabilities corresponding to each category of rearrangement of the plurality of categories of rearrangements.

13. The method of claim 12, wherein the plurality of categories comprise:
   a category of clustered deletions of size 1-10 kb;
   a category of clustered deletions of size 10-100 kb;
   a category of clustered deletions of size 100 kb-1 Mb;
   a category of clustered deletions of size 1 Mb-10 Mb;
   a category of clustered deletions of size >10 Mb;
   a category of clustered tandem duplications of size 1-10 kb;
   a category of clustered tandem duplications of size 10-100 kb;
   a category of clustered tandem duplications of size 100 kb-1 Mb;
   a category of clustered tandem duplications of size 1 Mb-10 Mb;
   a category of clustered tandem duplications of size >10 Mb;
   a category of clustered inversions of size 1-10 kb;
   a category of clustered inversions of size 10-100 kb;
   a category of clustered inversions of size 100 kb-1 Mb;
   a category of clustered inversions of size 1 Mb-10 Mb;
   a category of clustered inversions of size >10 Mb;
   a category of clustered translocations;
   a category of non-clustered deletions of size 1-10 kb;
   a category of non-clustered deletions of size 10-100 kb;
   a category of non-clustered deletions of size 100 kb-1 Mb;
   a category of non-clustered deletions of size 1 Mb-10 Mb;
   a category of non-clustered deletions of size >10 Mb;
   a category of non-clustered tandem duplications of size 1-10 kb;
   a category of non-clustered tandem duplications of size 10-100 kb;
   a category of non-clustered tandem duplications of size 100 kb-1 Mb;
   a category of non-clustered tandem duplications of size 1 Mb-10 Mb;
   a category of non-clustered tandem duplications of size >10 Mb;
   a category of non-clustered inversions of size 1-10 kb;
   a category of non-clustered inversions of size 10-100 kb;
   a category of non-clustered inversions of size 100 kb-1 Mb;
   a category of non-clustered inversions of size 1 Mb-10 Mb;
   a category of non-clustered inversions of size >10 Mb; and
   a category of non-clustered translocations.

* * * * *